United States Patent
Hawes et al.

(10) Patent No.: US 7,408,123 B2
(45) Date of Patent: Aug. 5, 2008

(54) OCCUPANT SENSING APPARATUS WITH LOAD DISPERSION LIMITING

(75) Inventors: Kevin J. Hawes, Greentown, IN (US); Duane D. Fortune, Lebanon, IN (US); Morgan D. Murphy, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 11/600,396

(22) Filed: Nov. 16, 2006

(65) Prior Publication Data

US 2008/0116725 A1     May 22, 2008

(51) Int. Cl.
B60R 21/015   (2006.01)
G01G 19/10    (2006.01)

(52) U.S. Cl. .......... 177/136; 177/144; 177/208; 177/254; 180/273; 280/735

(58) Field of Classification Search ........ 177/136, 177/144, 208, 209, 254; 180/273; 280/735; 701/45
See application file for complete search history.

(56) References Cited

U.S. PATENT DOCUMENTS

| | | | |
|---|---|---|---|
| 5,904,219 A | * | 5/1999 | Anahid et al. ............... 180/273 |
| 5,918,696 A | * | 7/1999 | VanVoorhies ............... 180/273 |
| 5,987,370 A | * | 11/1999 | Murphy et al. ................ 701/45 |
| 6,101,436 A | * | 8/2000 | Fortune et al. ................ 701/45 |
| 6,246,936 B1 | * | 6/2001 | Murphy et al. ................ 701/45 |
| 6,490,936 B1 | * | 12/2002 | Fortune et al. ......... 73/862.581 |
| 7,043,997 B2 | * | 5/2006 | Mattson et al. ............... 73/800 |
| 2005/0006151 A1 | * | 1/2005 | Mattson et al. | |

FOREIGN PATENT DOCUMENTS

| | | | |
|---|---|---|---|
| JP | 09-076797 A | * | 3/1997 |
| JP | 09-182647 A | * | 7/1997 |
| JP | 2005-131277 A | * | 5/2005 |
| JP | 20026-175249 A | * | 7/2006 |

* cited by examiner

Primary Examiner—Randy W Gibson
(74) Attorney, Agent, or Firm—Doug D. Fekete

(57) ABSTRACT

A seat occupant sensing apparatus includes a notched foam bottom seat cushion and a pressure-responsive sensor disposed between the bottom cushion and a frame of the seat. The notch is a narrow channel on the underside of the foam cushion that extends upward into the foam to limit and direct dispersion of occupant loading through the cushion. A rectangular notch smaller in dimension than a child seat frame is formed in a central region of the foam cushion, and a fluid-filled bladder or other force-responsive sensor mat is disposed substantially within the perimeter of the notch. The sensor will detect a normally seated occupant due to the relatively uniform seat load, but will not detect a cinched-down child seat because the notch limits dispersion of child seat loading in the direction of the sensor.

5 Claims, 3 Drawing Sheets

OCCUPANT SENSING APPARATUS WITH LOAD DISPERSION LIMITING

TECHNICAL FIELD

The present invention is directed to occupant sensing and discrimination apparatus for a vehicle seat.

BACKGROUND OF THE INVENTION

Occupant sensing systems are frequently used in connection with air bags and other pyrotechnically deployed restraints as a means of determining if the restraints should be deployed in the event of sufficiently severe crash. For example, air bag deployment is generally allowed in the case of a normally seated adult occupant, but suppressed in the case of a child or infant seat (both of which are referred to herein as a child seat) placed on the vehicle seat and cinched down with a seat belt or child seat anchor.

One common and generally cost-effective approach to occupant sensing involves installing a fluid-filled bladder under the bottom foam cushion of the vehicle seat and measuring the fluid pressure in the bladder with a pressure-responsive sensor. The under-cushion location of the sensor is preferred because occupant comfort is not affected and because the cushion protects the sensor from sharp objects brought into contact with the exposed surface of the seat. Exemplary systems of this type are disclosed, for example, in the U.S. Pat. Nos. 5,987,370 and 6,246,936 to Murphy et al., and the U.S. Pat. Nos. 6,101,436 and 6,490,936 to Fortune et al., all of which are assigned to Delphi Technologies, Inc., and incorporated herein by reference.

While the above-described sensing approach works well for normally seated occupants, it is still difficult to reliably distinguish between a light-weight normally seated adult (a $5^{th}$ percentile female adult, for example) and a cinched down child seat because the cinching increases the apparent weight of the child seat. Although it is possible to reliably distinguish between these two types of occupants by sensing the distribution of the occupant weight across the seat, it is difficult to obtain an accurate representation of the actual weight distribution because the occupant weight tends to disperse as it is transmitted through the foam seat cushion to the sensor. Accordingly, what is needed is a cost-effective occupant sensing apparatus having the capability of reliably distinguishing between a cinched child and a normally seated adult of similar apparent weight.

SUMMARY OF THE INVENTION

The present invention is directed to an improved occupant sensing apparatus for a vehicle seat, including a notched foam bottom seat cushion and a pressure-responsive sensor disposed between the bottom cushion and a frame of the seat. The notch is a narrow air-filled channel on the underside of the foam cushion that extends upward into the foam to limit and direct dispersion of occupant loading through the cushion. In a preferred embodiment, a rectangular notch smaller in dimension than a child seat frame is formed in a central region of the foam cushion, and a fluid-filled bladder or other force-responsive sensor mat is disposed substantially within the perimeter of the notch. The sensor will detect a normally seated occupant due to the relatively uniform seat load, but will not detect a cinched-down child seat because the notch limits dispersion of child seat loading in the direction of the sensor. Alternately, a second sensor can be disposed outside the perimeter of the notch to positively detect a cinched-down child seat, while retaining the ability to reliably distinguish the child seat from a normally seated occupant based on the different sensor responses.

DESCRIPTION OF THE PREFERRED EMBODIMENTS

Figure 1:
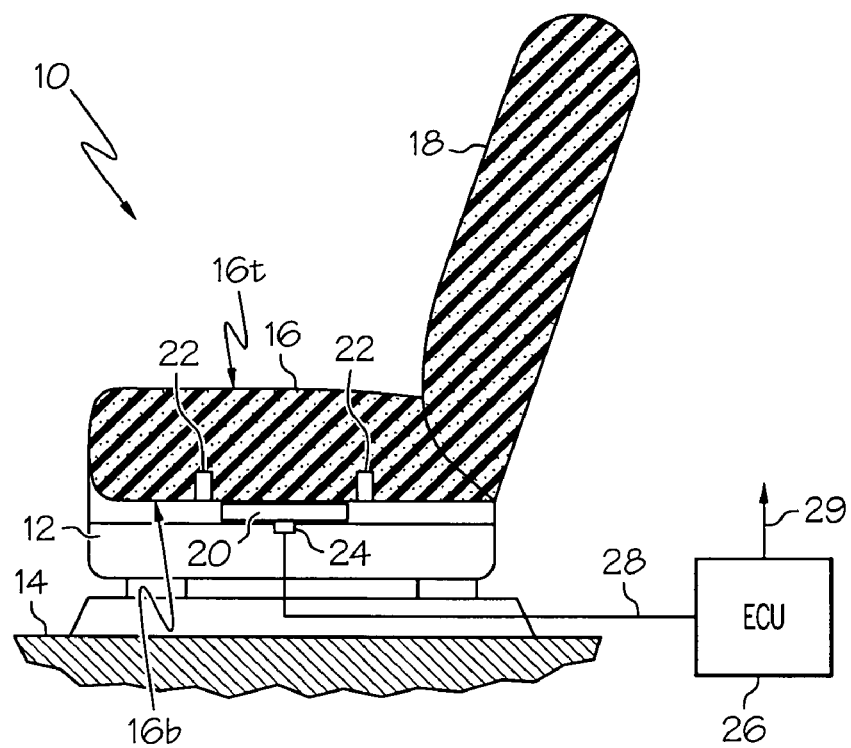
FIG. 1 diagrammatically depicts a vehicle seat equipped with an occupant sensing apparatus according to a first embodiment of this invention, including a pressure-responsive sensor and a notched foam bottom seat cushion.
Figure 2:
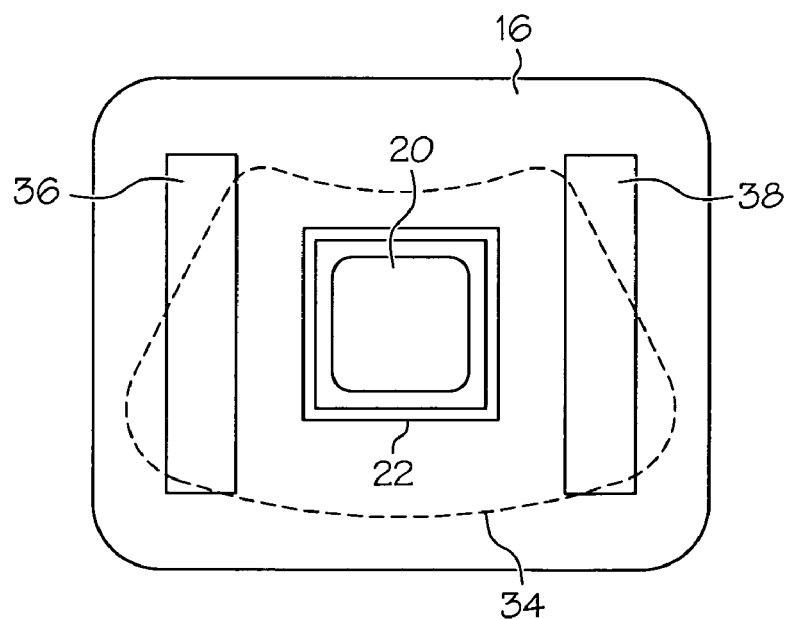
FIG. 2 is a diagram of the occupant sensing apparatus of FIG. 1, including the outline of a child seat positioned on the bottom seat cushion and the pressure outline of a normally seated adult occupant.

FIGS. 1-2 illustrate a first embodiment of the Referring to FIG. 1, the reference numeral 10 generally designates a vehicle seat and occupant sensing apparatus according to this invention. The seat includes a frame 12 attached to the vehicle floor pan 14, a foam bottom cushion 16, and a foam back cushion 18. For definitional purposes, the foam bottom cushion 16 has a top surface 16t on which the occupant sits, and a bottom surface 16b that is opposite top surface 16t and that faces the seat frame 12. The occupant sensing apparatus includes a pressure responsive sensor such as a fluid-filled elastomeric bladder 20 and an air-filled channel or notch 22 that extends from the bottom surface 16b of foam bottom cushion 16 toward the top surface 16t. The bladder 20 is disposed between the foam bottom cushion 16 and the frame 12, and is responsive to occupant weight applied to the cushion's top surface 16t. A pressure sensor 24 responsive to the fluid pressure in bladder 20 provides a pressure signal to an electronic control unit (ECU) 26 via line 28, and ECU 26 processes the pressure signal to detect the presence of a seat occupant and to discriminate between a normally seated occupant and a cinched-down child seat. The outcome of the signal processing is an occupant status signal, and ECU 26 outputs the occupant status signal on line 29. In a typical mechanization, the occupant status signal on line 29 is supplied to an airbag control module that controls the deployment of airbags and other occupant restraints, and the occupant status is one factor considered in determining how and when to deploy the restraints.

As best seen in FIG. 2, the bladder 20 of the illustrated embodiment is rectangular in outline and is disposed in a central region of the foam bottom cushion 16. The notch 22 is also rectangular in outline and is laterally offset from the bladder 20. Or put differently, the bladder 20 is disposed laterally within the perimeter of notch 22. Of course, the bladder 20 and/or notch 22 may be circular, elliptical or some other shape, or notch 22 does not necessarily have to completely surround the bladder 20.

Figure 3:
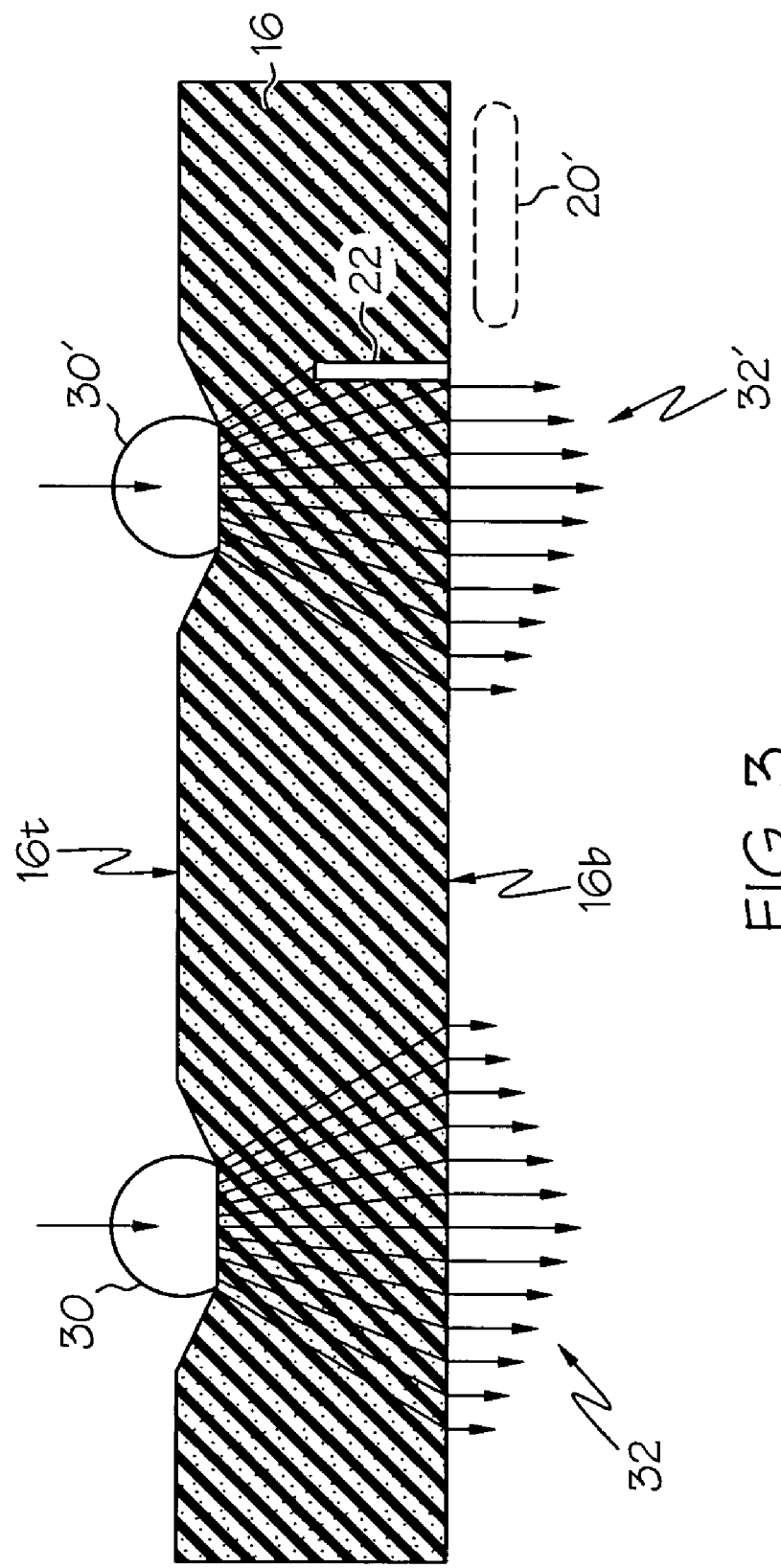
FIG. 3 is a diagram illustrating diffusion of occupant loading though a foam seat cushion, with and without the notch of FIGS. 1-2.

The purpose and operation of the notch 22 is illustrated in FIG. 3, which depicts the dispersion of loading or force due to an object 30 or 30' resting on the top surface 16t of foam bottom cushion 16. In the absence of a notch 22, the foam cushion 16 uniformly disperses an object's load both downward and outward, as illustrated by the force lines 32 emanating from object 30. However, the presence of a notch 22 laterally offset from an object limits the lateral dispersion of the object's load, as illustrated by the force lines 32' emanating from object 30'. Additionally, the notch 22 tends to concentrate or focus the loading in the remainder of the loading area, as indicated by the increased length of force lines 32' compared with force lines 32. If a pressure-responsive sensor 20' is disposed under the cushion 16 laterally outboard of both the object 30' and the notch 22, the notch has the effect of shielding the object's loading from the sensor 20'. In other words, the sensor 20' will not detect the presence of object 30', though a sensor similarly disposed with respect to the object 30 would detect the presence of object 30.

Referring again to FIG. 2, the reference numerals 34 and 36-38 designate two different occupants of similar apparent overall weight. The reference numeral 34 designates the load outline applied to the top surface 16t of bottom cushion 16 for a slender normally-seated occupant, such as a $5^{th}$ percentile female adult. On the other hand, the objects designated by the reference numerals 36 and 38 represent the support frame rails of a child seat placed on the top surface 16t of foam seat cushion 16; i.e., the areas of contact between a child seat and the top surface 16t. A seat belt (not shown) looped over or through the child seat cinches the child seat downward onto the cushion 16, imparting to the child seat an apparent weight that is similar to that of the normally seated adult occupant. The normally seated adult occupant loads nearly all of the seat area within the load outline 34. Although the notch 22 shields the sensor 20 from some of the occupant's loading, the sensor 20 nevertheless detects the presence of the occupant because a significant portion of the occupant load is disposed within the perimeter of the rectangular notch 22. On the other hand, the load applied to the cushion's top surface 16t by the cinched-down child seat is localized laterally outside the perimeter of the rectangular notch 22, and the notch 22 limits dispersion of loading through the cushion 16 in the direction of sensor 20. As a result, the sensor 20 does not detect the presence of the cinched-down child seat.

The embodiment of FIGS. 1-2 effectively discriminates between a normally seated adult occupant and a cinched-down child seat of similar apparent weight, but does not discriminate between an unoccupied seat and a seat occupied by a cinched-down child seat. This is acceptable in situations where air-bag deployment is allowed for a normally seated occupant but suppressed if the seat is unoccupied or occupied by a child seat.

Figure 4:
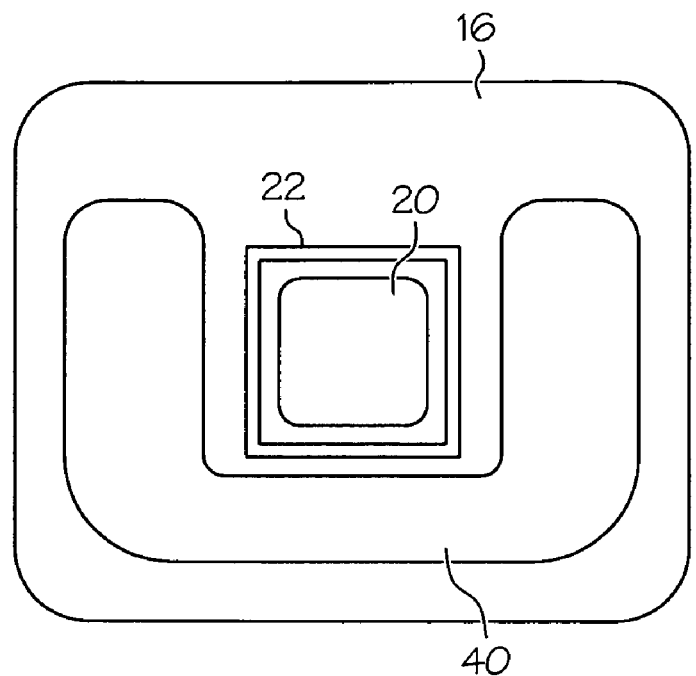
FIG. 4 is a diagram of an occupant sensing apparatus according to a second embodiment of this invention, including a secondary pressure-responsive sensor.

FIG. 4 depicts an embodiment of the occupant sensing apparatus that utilizes a secondary pressure-responsive sensor 40 to discriminate between an unoccupied seat and a seat occupied by a cinched-down child seat. Like sensor 20, the sensor 40 is disposed between the bottom surface 16b of foam cushion 16 and the seat frame 12. But unlike sensor 20, the sensor 40 is disposed laterally outside the perimeter of the notch 22. In the illustrated embodiment, the sensor 40 essentially wraps around the perimeter of notch 22, but obviously other configurations are also possible. In this embodiment, loading due to a normally-seated occupant will be sensed by both sensors 20 and 40, but loading due to a cinched-down child seat of similar apparent weight will be sensed only by sensor 20 due to the notch 22, and neither sensor 20, 40 will detect an occupant in the case of an unoccupied seat. Ordinarily, loading will not be applied solely to the sensor 20, and the detection of such as load may be used to initiate a sensor diagnostic routine or failure indication.

Figure 5:
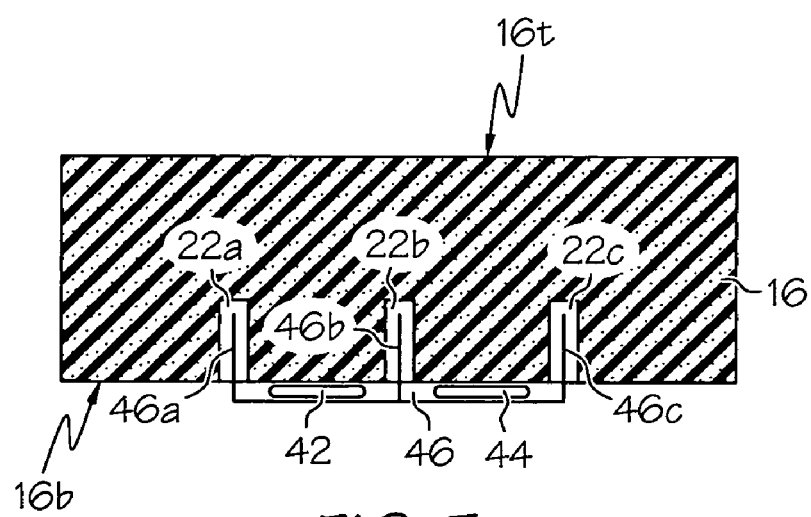
FIG. 5 is a diagram of an occupant sensing apparatus according to a third embodiment of this invention, including a sensor carrier with vertical partition walls that extend into correspondingly disposed bottom seat cushion notches.

FIG. 5 depicts an embodiment including a sensor carrier or mat 46 that locates and retains the seat sensors with respect to the bottom cushion 16 without adversely affecting the load shielding and occupant differentiation described above in reference to FIGS. 1-4. The illustration of FIG. 5 shows a set of three notches 22a, 22b, 22c, which may or may not be joined to each other, and a set of two pressure-responsive sensors 42 and 44 disposed between the cushion's bottom surface 16b and the seat frame 12. Sensor 42 is laterally disposed between notches 22a and 22b, while sensor 44 is laterally disposed between notches 22b and 22c. The sensor mat 46 comprises a horizontal portion that is disposed between the sensors 42, 44 and the frame 12, and a set of vertical partitions 46a, 46b, 46c that extend upward into the foam cushion notches 22a, 22b, 22c, respectively. The horizontal portion of the sensor mat 46 provides a protective barrier for the sensors 42 and 44, while the vertical partitions 46a-46c laterally locate the sensor mat 46 (and hence, sensors 42 and 44) with respect to the bottom cushion 16 due to lateral interference between the notches 22a-22c and the vertical partitions 46a-46c. Additionally, the vertical partitions 46a-46c can enhance the load dispersion limiting of the notches 22a-22c without affecting the occupant's seating comfort.

Although the height of the notches 22, 22a-22c shown in FIGS. 1-5 may vary depending on the application, it is believed that a notch height equal to approximately 30% of the foam cushion thickness would achieve acceptable results in most applications. The width dimension of the notches 22, 22a-22c may be approximately 10 mm, although a narrower dimension may be used in applications including a sensor mat 46 with vertical partitions as shown in FIG. 5.

In summary, the present invention provides a practical and cost-effective occupant sensing apparatus that can reliably distinguish between a cinched-down child and a normally seated occupant of similar apparent weight. While the apparatus has been described in reference to the illustrated embodiment, it should be understood that various modifications in addition to those mentioned above will occur to persons skilled in the art. For example, the sensors 20, 40 may be individual sensors or part of a multi-cell sensor mat, such as a capacitive sensor array. Consequently, the number of sensors and the number of notches (as well as their size and shape) may be different than disclosed herein. Accordingly, it is intended that the invention not be limited to the disclosed embodiment, but that it have the full scope permitted by the language of the following claims.

The invention claimed is:

1. Occupant sensing apparatus for a vehicle seat having a foam seat cushion with a bottom surface supported by a seat frame and a top surface for supporting a seat occupant, the sensing apparatus comprising:

at least one pressure-responsive sensor disposed between the bottom surface of the foam seat cushion and the seat frame;

means including at least one air channel extending from the bottom surface of the foam seat cushion toward the top surface of the foam seat cushion over a distance of approximately 30% of a thickness of the foam seat cushion for limiting lateral dispersion of occupant seat loading in the foam seat cushion, said air channel being laterally offset with respect to the sensor to effectively isolate the sensor from occupant seat loading laterally outside of the air channel; and a processor for discriminating among seat occupants based on a signal produced by the sensor.

2. The occupant sensing apparatus of claim 1, where the pressure responsive sensor is disposed in a central lateral region of the foam seat cushion, laterally within an outline defined by points of contact between a child seat and the top surface of the foam seat cushion, and the air channel surrounds the sensor.

3. The occupant sensing apparatus of claim 2, where the processor discriminates between a normally seated occupant and a child seat occupant based on the signal produced by the sensor.

4. The occupant sensing apparatus of claim 1, further comprising:
   a sensor carrier including a horizontal portion disposed between the sensor and the seat frame and at least one vertical partition that is laterally offset from the sensor and extends upward into the air channel.

5. The occupant sensing apparatus of claim 4, where the sensor carrier locates the sensor with respect to the foam seat cushion, and enhances the lateral load dispersion limiting of the air channel.

* * * * *